United States Patent Office 2,865,886
Patented Dec. 23, 1958

2,865,886

POLYETHYLENE POLYAMINE-EPOXIDE COMPOSITIONS

Sylvan Owen Greenlee, Racine, Wis., assignor to Devoe & Raynolds Company, Inc., Louisville, Ky., a corporation of New York No Drawing. Application February 11, 1952
Serial No. 271,069

2 Claims. (Cl. 260—47)

This invention relates to new complex amine-epoxide compositions, and more particularly to such compositions capable of conversion into insoluble, infusible products, and valuable for use in making varnishes and protective coatings, in making molding compositions and articles, as adhesives, and in making films and fibres, etc. The invention includes various new amine-epoxy compositions and reaction products and articles and products made therefrom.

The new amine-epoxy compositions and products are made by reacting amines with complex epoxides produced by the reaction of polyhydric phenols with polyfunctional halohydrins or with polyepoxides to form complex reaction products containing terminal epoxide groups. Such epoxide products with which the amines are reacted are advantageously complex polymeric products resulting from the reaction of polyhydric phenols with polyfunctional halohydrin or polyepoxides in proportions to give terminal epoxide groups in the polymeric reaction products. Such complex epoxide products and compositions are described in my companion applications Serial No. 617,176, filed September 18, 1945 (now abandoned), Serial No. 621,856, filed October 11, 1945 (now abandoned), and Serial No. 626,449, filed November 2, 1945, now Patent No. 2,592,560.

One of the objects of the present invention is the production of infusible and insoluble reaction products of complex epoxides and amines in suitable proportions which have remarkable chemical resistance combined with hardness, toughness, flexibility, lack of contraction on conversion, and other desirable properties.

Another object of the invention is the production of amine-epoxide compositions capable of use as raw materials for the production of such conversion products.

Another object of the invention is the production of amine-epoxy compositions which on conversion result in cross-linking of the complex epoxides through reaction of active hydrogens of amines, and particularly of polyamines, with epoxide groups.

Another object of the invention is the production of fusible amine-epoxy compositions and reaction products useful for various purposes and still containing epoxy groups capable of further reaction.

Another object of the invention is the production of compositions and reaction products of polyepoxide with amines in proportions giving final infusible products of remarkable chemical resistivity and other desirable properties.

Another object of the invention is the production of solutions of such amine-epoxy compositions for use in making varnishes and protective coatings, impregnating solutions, films, filaments, etc.

Another object of the invention is the production of molding mixtures and compositions capable of conversion into infusible, molded articles and products, and the articles and products so produced.

Other objects of the invention and the nature and advantages of the invention will further appear from the following more detailed description.

In my companion application Serial No. 617,176, filed September 18, 1945 (now abandoned), I have described complex, polymeric reaction products of polyhydric phenols with polyfunctional halohydrins such as epichlorhydrin and glycerol dichlorhydrin, with the difunctional chlorhydrin used in proportions in excess of that equivalent to the polyhydric phenol and less than twice the equivalent amount, by carrying out the reaction with the addition of caustic alkali equal to or somewhat in excess of the amount required to combine with the halogen of the halohydrin and giving complex, polymeric products containing both terminal epoxy groups and terminal primary hydroxyl groups, and with the epoxy groups in general considerably in excess of the terminal primary hydroxyl groups. Such complex, polymeric epoxy-hydroxy products and compositions are advantageously used for reaction with amines to form the new amine epoxy compositions and products of the present invention.

In my companion application Serial No. 621,856, filed October 11, 1945 (now abandoned), I have described epoxy-hydroxy compositions resulting from the reaction of a polyhydric phenol with a polyfunctional halohydrin such as epichlorhydrin in approximate proportions of 2 mols of epichlorhydrin to one of dihydric phenol to give resinous products containing both terminal epoxy and hydroxy groups with the proportion of terminal epoxy groups considerably in excess of the terminal hydroxy groups. Such epoxy-hydroxy compositions are also advantageously used in forming the new amine-epoxy compositions and products of the present invention.

In my companion application Serial No. 626,449, filed November 2, 1945 now Patent No. 2,592,560, I have described new polyepoxy products and compositions obtained by the direct addition of polyhydric phenols with polyepoxides and with the proportion of polyepoxides reacting with the polyhydric phenols in excess of the equivalent amount so that the resulting reaction products will contain terminal epoxy groups. Such polyepoxy reaction products, and particularly complex, polymeric, polyepoxy reaction products, are advantageously used in making the new amine-epoxy compositions and products of the present invention.

Various amines, and particularly primary amines or polyfunctional amines, are useful in making the new amine-epoxy compositions and products. Apparently all hydrogens directly attached to nitrogen are active hydrogens in reacting with epoxide groups but amines vary in their reactivity with the complex epoxides. Aliphatic amines are more active than aromatic amines and cyclic amines of the aminodiazine and aminotriazine series. With certain of the less active amines it has been found desirable and advantageous to add catalysts such as traces of basic materials to facilitate reaction. For example, melamine was found to be slow to react with the complex epoxides but reacted rapidly in the presence of a trace of sodium hydroxide.

In general, amines containing at least two active hydrogens per molecule which are directly attached to nitrogen are satisfactory materials, when used in suitable proportion, for preparing infusible products in the practice of the invention. Amines containing one hydrogen per molecule which is directly attached to nitrogen are in general satisfactory for preparing fusible amine-epoxy products and compositions; while amines containing more than one active hydrogen per molecule directly attached to nitrogen can be used to form fusible amine-epoxide compositions and reaction products if used in limited amounts, Polyamines, and particularly aliphatic polyamines, are particularly advantageous. Thus in the case of polyethylene polyamines such as diethylene triamine, triethylene tetramine, etc., a number of active hydrogens are provided by the different amino groups which are separated from each other by hydrocarbon groups and enable the amine to react with a number of epoxide groups with resulting cross-linking to give complex amine-epoxy reaction products.

Fusible amine-epoxy reaction products can be prepared with monofunctional amines or with limited amounts of polyfunctional amines under proper reaction conditions. The maximum complexity of amine-epoxy reaction products appears to be obtained when polyfunctional amines, such as primary amines and polyamines, are used with the complex epoxides in proportions close to the equivalent amounts. Complexity of the products appears to decrease as more or less than the equivalent amounts of amines are used but infusible products can nevertheless be obtained with more or less than the equivalent amount of the amines in many cases. Thus with some of the amines, particularly aliphatic polyamines, it is possible to obtain infusible products with considerably less than equivalent amounts of the amines, as well as with more than the equivalent amount, probably due to the fact that the complex epoxides are relatively high in molecular weight and the amount of coupling necessary to make them infusible is relatively small.

The complexity of the final products may also be controlled to some extent otherwise than by adjusting the ratio of amine and epoxy reactants, as by using moderate reaction conditions such as lower temperatures or shorter reaction periods or both, to give fusible products which are valuable intermediate products and which may, if the amine and epoxide are only partially reacted and are in proper proportions for further reaction, give infusible products when subjected to such further reaction or conversion.

The complex epoxide compositions used with the amines are themselves capable of polymerization by reaction of epoxy groups with hydroxyl groups, particularly in the presence of small amounts of a catalyst. The complex epoxy compositions made from polyhydric phenols and epichlorhydrin contain both terminal epoxy groups and terminal primary hydroxyl groups and, in general, the number of terminal epoxy groups is considerably in excess of the number of terminal primary hydroxyl groups. In polymeric products containing intermediate hydroxyl groups, the total number of hydroxyl groups may be considerably in excess of the number of epoxy groups. Polymerization of such complex epoxy-hydroxy compounds may take place through terminal epoxy and primary hydroxyl groups to form long chain polymers or through terminal epoxy groups and intermediate hydroxyl groups to form polydimensional polymers.

In the case of polyepoxides made by the direct reaction of bisphenol with an excess of polyepoxide there will also be hydroxyl groups, and, in the case of polymeric products, the number of hydroxyl groups may be in excess of the terminal epoxy groups. Such products are capable of polymerization by reaction of terminal epoxide groups with intermediate hydroxyl groups to form complex, polydimensional polymer, particularly when a catalyst is used.

When such complex epoxide compositions are reacted with amines, the action of the amine may be one of direct addition through epoxy groups and it may be in part a catalytic action promoting the combination of epoxy and hydroxyl groups to form ether linkages, particularly where the amine is used in less than equivalent proportion such that there is insufficient amine to react with all of the epoxide groups.

The complex epoxide compositions which are reacted with the amines are resinous products which can be made of varying melting points, epoxide content, and degree of polymerization from soft resins to harder resins of higher melting point. In general, these resins are soluble, unless too highly polymerized, in solvents such as acetone, methyl ethyl ketone, diacetone alcohol, cyclohexanone, etc. and can be used in solution with the addition of the amines in forming liquid compositions for use e. g. in making clear or pigmented varnishes, in making transparent films and filaments, and in impregnating wood, fabrics and other porous material, etc.

The reaction of the amines with such complex epoxides, particularly when polyfunctional amines are used, appears to be one of cross-linking the complex epoxide molecules through reaction of the amines with epoxide groups. But such cross-linking reaction may be combined with a simultaneous polymerization reaction between epoxide and hydroxyl groups, particularly when the amine is used in less than equivalent proportion.

When polyepoxides are reacted with the amines and where the polyepoxides contain only or mainly terminal epoxide groups with intermediate hydroxyl groups, the action of the amines, and particularly of the more active polyfunctional amines, is such that considerably less than the equivalent amount of amine will react with the polyepoxide to form infusible products; while the epoxide groups which are present in excess of those reacting with the amine may react to a greater or less extent with hydroxyl groups, in which case the complex epoxy-amine reaction product may have the polyepoxides united in part through amine cross-linking and in part through epoxy-hydroxide reaction to form ether linkages.

Similarly in the case of the complex polymeric epoxides which also contain terminal hydroxyl groups, the final hardening operation, particularly when less than the equivalent amount of amine is used, may be in part cross-linking through the amines and in part by polymerization through epoxy-hydroxy reactions to form ether linkages.

The complex epoxides and polyepoxides used for reacting with the amines may themselves be carried to a high degree of polymerization in which case only a small amount of amine may be necessary to convert the highly polymerized epoxides into an infusible state. With products of lower melting point and lower degree of polymerization an increased amount of cross-linking or polymerization in the presence of the amine, a large proportion of amine, may be necessary to give the final insoluble product.

In referring to equivalent amounts of amine and of the complex polyepoxides, each active hydrogen attached to nitrogen of the amine is considered equivalent to one epoxide group. The equivalent weight of the amine is the weight which will contain one such active amine hydrogen when used with an equivalent weight of the complex epoxides containing one epoxide group. Thus with a primary monoamine having two active amino hydrogens, the equivalent weight is one-half the molecular weight when used with the weight of the polyepoxides equivalent to one epoxide group.

In referring to equivalent amounts of amines, or to less than equivalent amounts, in the following examples, the amounts are those used with the complex epoxides, and it is not intended to mean that the amount used is completely reacted. While theoretically complete reaction might take place it is probable that the reaction is a partial and incomplete reaction between part of the active hydrogens of the amines and epoxide groups.

The epoxide equivalent of the complex epoxides used can be determined for practical purposes by determining the equivalent weight of the composition per oxide group.

The epoxide content of the epoxide-hydroxy compositions hereinafter indicated were determined by heating a 1 gram sample of the epoxide composition with an excess of pyridine containing pyridine hydrochloride (made by adding 16 cc. of concentrated hydrochloric acid per liter of pyridine) at the boiling point for 20 minutes and back titrating the excess pyridine-hydrochloride with 0.1 N sodium hydroxide using phenolphthalein as indicator, and considering that 1 HCl is equal to 1 epoxide group.

The following table gives illustrative examples of hydroxy-epoxy compositions resulting from the reaction of bisphenol with varying proportions of epichlorhydrin with the use of caustic soda according to said companion applications, the table giving the softening points of the resin, the equivalent weight to epoxide as determined by the above method, and the average molecular weight, in the case of the lower melting resins, as determined by the boiling point method.

|   | Softening Point, °C. | Equivalent Weight to Epoxide | Average Molecular Weight |
|---|---|---|---|
| 1 | 43 | 325 | 451 |
| 2 | 84 | 591.5 | 791 |
| 3 | 90 | 730 | 807 |
| 4 | 100 | 860 | 1,133 |
| 5 | 110 | 1,013 | |
| 6 | 121 | 1,248 | |
| 7 | 132.5 | 5,485 | |
| 8 | 146 | 3,155 | |

Solutions were made of each of the above mentioned resins in methyl ethyl ketone as a solvent using an equal weight of solvent to give a 50% solution. An amount of diethylene triamine was added to each solution amounting to about 1.7 active hydrogen for each epoxy group of the resin (corresponding to 34.4 parts by weight of diethylene triamine for the equivalent weight indicated in the above table). Films were spread from the solutions, air dried for thirty minutes, and baked at 150° C. for thirty minutes, and in each case the film was converted into an infusible, insoluble film.

Similar compositions were made by adding the equivalent amount of diethylene triamine to the same weights of resin in solid form (20.6 parts to the equivalent weight of the above table), in some cases using a solvent to insure blending of the diethylene triamine with the resin followed by removal of the solvent. The resulting compositions on similarly heating to 150° C. for thirty minutes were converted into insoluble, infusible products.

With the first resin in the table above, an infusible product was obtained with half the equivalent amount of diethylene triamine (10.3 parts) and triethylene tetramine (12.1 parts) when similarly heated while with half the equivalent amount of lauryl amine (46 parts) a fusible resin was obtained of softening point of 70° C.

With the second resin of the above table an infusible product was obtained with half the equivalent of diethylene triamine (10.3 parts) when similarly heated, and with one-quarter the equivalent of tetraethylene pentamine (6.5 parts) on heating for 90 minutes at 150° C.; while a fusible product of softening point of 81° C. was obtained by heating with one-quarter the equivalent amount of diethylene triamine (5.1 parts) at 150° C. for 60 minutes.

With the third product of the above table, an infusible product was obtained by heating with one-half the equivalent amount of melamine (8.9 parts), one-half the equivalent amount of bis phenol (114 parts), and 0.1% of caustic soda on the weight of the resin, by heating for 30 minutes at 150° C. and 30 minutes at 200° C. An infusible product was also obtained with the third resin of the table with half the equivalent amount of triethylene triamine (10.3 parts) on heating for 60 minutes at 150° C., and also with one-half the equivalent amount of octadecenyl amine (72 parts), on heating for three hours at 200° C. A fusible product of 118° C. softening point was obtained by heating with the equivalent amount (71 parts) of beta-naphthylamine for three hours at 200° C.

An infusible product was also obtained with the fourth resin of the above table with one-half the equivalent of diethylene triamine (10.3 parts) on heating for 30 minutes at 150° C.; and also with one-half the equivalent of hexamethylene diamine (15 parts) on similar heating; while similar heating with only one-quarter of the equivalent amount of diethylene triamine (5.1 parts) gave a fusible product having a softening point of 103° C.

With the fifth resin of the above table an infusible product was obtained with half the equivalent (10.3 parts) and also with one-quarter of the equivalent (5.1 parts) of diethylene triamine on heating for 30 minutes at 150° C.

With the sixth product of the above table an infusible product was obtained with one-quarter the amount of diethylene triamine (5.1 parts) on heating for 30 minutes at 150° C.; while with one-quarter the equivalent of beta naphthylamine (18 parts) and heating for 30 minutes at 200° C. a product was obtained having a softening point of 122° C.

With the eighth product of the above table an infusible product was obtained with one-quarter the equivalent of diethylene triamine (5.1 parts) on heating for 30 minutes at 150° C.; and with one-quarter the equivalent amount of octadecenylamine (36 parts) on heating for 30 minutes at 200° C.

The complex epoxides used with amines in the above examples were made from bis phenol and epichlorhydrin in varying proportions with the use of aqueous caustic alkali sufficient to combine with all of the chlorine of the epichlorhydrin or somewhat in excess thereof. Other complex epoxides can be made from other polyhydric phenols which are similarly capable of reacting with amines although the properties of the different complex epoxides will vary somewhat with different polyhydric phenols used and with different proportions of phenol and epichlorhydrin and with different degrees of polymerization.

Thus a complex epoxy composition prepared from 6 mols of hydroquinone and 7 mols of epichlorhydrin with 7.5 mols of aqueous caustic soda, and having a softening point of 92° C. and an equivalent weight to epoxide of 1105, when compounded with an equivalent amount of 2,4-diamino-diphenyl amine (40 parts per epoxide equivalent) gave an infusible product on heating for 2 hours at 150° C.

A complex epoxide made from a mixture of 3 mols of bis phenol, 2 mols of resorcinol and 6 mols of epichlorhydrin with 6.3 mols of aqueous caustic soda, and having a softening point of 101° C. and an equivalent weight to epoxide of 1300, when compounded with one-quarter the equivalent of tetraethylene pentamine (6.5 parts per epoxide equivalent), gave an infusible product on heating for 60 minutes at 150° C.

A complex epoxide made from 6 mols of resorcinol and 7 mols of epichlorhydrin with 7.76 mols of aqueous sodium hydroxide, and having a softening point of 80° C., and an equivalent weight to epoxide of 1146, was dissolved in methyl ethyl ketone to form a 50% solution and was compounded with the equivalent amount (20.6 parts to 1146 parts of resin) of diethylene triamine. The resulting solution when formed into a film air dried over night to a hard, flexible film; and similarly gave a hard, flexible film on baking for 30 minutes at 150° C.

A similar 50% solution of the same resin in methyl ethyl ketone was compounded with an equivalent weight of lauryl amine (91.5 parts to 1146 parts of resin), and films were similarly made from the resulting solution. These films similarly air dried over night and on baking for 30 minutes at 150° C. to form hard, flexible films.

In a similar manner other complex epoxides made from other polyhydric phenols with epichlorhydrin can be similarly treated to give infusible products or fusible resins, the amount of amine required varying somewhat with different epoxides and different amines.

In a similar manner complex polyepoxides can be similarly compounded with different amines and different proportions of amines to give infusible products or fusible products depending upon the particular amines and proportions of amines used and upon the particular polyepoxy composition employed for reaction therewith.

While the examples given above include heating of the amine-epoxide composition to bring about the reaction, it is also possible to obtain rapid conversion of the epoxide resins with somewhat larger amount of amines at lower temperatures.

It is thus possible by using suitable combinations of amines and complex epoxides to form infusible products at room temperature. For example, the third resin of the above table melting at 90° C. was dissolved in an equal weight of methyl ethyl ketone and treated with 5% of its weight with tetraethylene pentamine. The resulting solution when spread in thin films, and freed from solvent, converted to an infusible product at room temperature. Infusible films were likewise obtained from this composition by baking in an oven for 20 minutes at 100° C., for 15 minutes at 115° C., and for 10 minutes at 150° C. Although this solution is not stable for an indefinite period it is sufficiently stable for use in protective coatings for both air dry and baking application. The stability is illustrated by the following viscosity increase with time. The viscosity of a 50% solution of the resin (number 3 of the above table) in methyl ethyl ketone containing 5% by weight on the resin of tetraethylene pentamine showed the following results on standing for the times indicated.

| Original Viscosity | 24 hours | 48 hours | 72 hours | 96 hours |
|---|---|---|---|---|
| A1 | C | H | U | gel |

These viscosities were determined with a bubble viscosimeter.

The results show that the solution is suitable for application for at least three days. Nevertheless such solutions, although stable for three days, give films formed by spraying or brushing the material on to surfaces which lose the solvent, and show fair conversion within 4 or 5 hours, and at 10 to 12 hours the films are extremely flexible although at the beginning the films are very brittle.

It is a characteristic of such films that the reaction of the amine with the epoxide resin under suitable conditions will convert an initial brittle film into a desirable flexible film. Moreover, unlike oleoresinous varnishes and oil modified alkyl resins, the film thickness of the new compositions is not a factor in their conversion. In fact, layers of thicknesses which would no longer be classified as films, e. g. from one-quarter to one-half inch, show no signs of surface dry but convert uniformly throughout the layer. Thus one thick coat of this material may be applied where several thin coats of other types of film-forming compositions would be used.

The new compositions made with amines in suitable proportions thus form valuable protective layers and films when used either as clear varnishes or as pigmented varnishes, giving infusible films of remarkable resistance to chemicals and having other valuable desirable properties.

As illustrating the use of the new amine-epoxide compositions in making enamels, a black enamel was prepared from resin number 3 of the above table, having a softening point of 90° C., by forming a 50% solution of the resin in methyl isobutyl ketone, adding 113.7 parts of carbon black to 600 parts of the 50% solution, grinding the mixture in a steel ball mill for five days, then adding 175 parts of methyl isobutyl ketone and then adding 15 parts of diethylene triamine.

The resulting enamel, when formed into films, dried overnight to a tough, flexible, glossy film at room temperature; and it also converted to the same type film when baked in an oven for 15 minutes at 150° C.

A gray enamel was prepared by grinding in a steel ball mill for 5½ hours a mixture of pigments made up of 21 parts of lamp black, 24.5 parts of a lemon yellow ferric hydroxide, 3.5 parts of a red ferric oxide and 630 parts of rutile titanium dioxide, adding 2032 parts of the same epoxyhydroxy resin, melting at 90° C., as in the preceding example, but adding it to the mill in lump form, then adding 2032 parts of methyl isobutyl ketone and 101.5 parts of diethylene triamine.

The resulting gray enamel had the same conversion characteristics as the enamel of the preceding example.

The new compositions are also valuable for use in making molded objects, where the conversion forms infusible, molded products. They are also valuable for use in impregnating and laminating wood and fabrics, in making self-sustaining films and filaments, etc. It has been observed that films will harden even when immersed in water.

Infusible products produced from the new amine-epoxy compositions have been found to have extreme chemical stability. Varnish films prepared from several of these compositions were unaffected by immersion in 50% $H_2SO_4$ for one hour. Such films when immersed in boiling acetone (56.1° C.) for one hour softened so that they could be scratched with the fingernail while in the boiling acetone; however, such films quickly returned to their original glossy hardness upon removal from the boiling acetone and apparently little or no solution had occurred.

The infusible films show remarkable stability to caustic alkali. Films immersed in 50% aqueous sodium hydroxide and kept in a sealed bomb in an oven at 100° for one week, and similar tests using 5% aqueous sodium hydroxide, gave no observable effect from such treatment both in the case of air dried and baked films. Such stability to aqueous caustic alkali at high temperatures is surprising and a distinguishing characteristic of the new films. Such films are suitable as liners for food and processing equipment for many industrial uses. Such properties also make the new compositions valuable as film forming compositions for application over alkaline cement and alkaline plastering surfaces.

Molded objects and films formed from the infusible products of the present invention have extremely hard, glossy surfaces but, nevertheless, in spite of their extreme hardness, the structure is remarkably tough and flexible. In the past it has been generally recognized that in order to obtain hard films (shellac films being an example) flexibility must be sacrificed; but the insoluble films of the present invention combine hardness with flexibility.

As an indication of the hardness and flexibility of the films made by the reaction of amines with the complex epoxides, extremely hard, infusible films on glass enabled ribons of indefinite length to be stripped from a film from one to two mils thickness by the use of a sharp knife blade.

Such films remain surprisingly flexible at sub-zero temperatures. Varnish films prepared from these compositions have been tested at —80° C. and showed good flexibility. In general physical toughness and structure the infusible amine-epoxy resins are comparable to finger nail and horn.

When molded objects are formed by converting a mixture of the epoxy and amine in a mold no contraction has been observed and, in fact, a slight expansion was observed in some cases and reproducible results obtained. While I do not desire to limit myself by any theoretical expansion of the expansion of the resins on hardening, it may be the opening up of the epoxide groups through reaction with amines or the opening up of epoxide groups through reaction with hydroxyl groups to form ether linkages tends to cause separation of the reacting molecules instead of contraction which is characteristic of many condensation and polymerization reactions.

This lack of contraction or slight expansion in the mold is highly valuable for many applications, enabling tight fitting molded articles to be obtained. For example, brushes of many types are made by using a heat converting resin to cement the bristles into the brush ferrule. If the resin contracts during heat conversion the molded material becomes loose fitting in the ferrule. The new epoxideamine resin and compositions of the present invention give a tight fitting mold within the brush ferrule. Similarly molded inserts can be made which are tight fitting when the composition is hardened in place.

The new infusible epoxide-amine reaction products give extremely glossy films when used as clears or as pigmented enamels. This is highly desirable in the protective coating industry to obtain desired amount of gloss, since it is often impossible to obtain such gloss when known vehicles are used.

The new amine-epoxide compositions may be pigmented with the usual pigments known to the protective coating industry to give enamels. The epoxide may be pigmented either before or after the amine is added.

The new epoxide-amine reaction products, particularly with the lower proportions of amines, have been found to possess an extremely high adherence to glass, metal, wood and other surfaces, and these compositions can be used to advantage in the lamination of glass or metal, in the lamination of wood to form plywood or other laminated wood products, etc.

The new compositions, particularly when used in solution, are valuable impregnating compositions for surface coatings or for impregnating porous and fibrous materials such as fabrics and other porous and fibrous materials. It is one advantage of the new compositions that high concentrations can be used with a limited amount of solvent such that thick coatings are readily applied and the solvent readily removed, the hardening taking place in the film through chemical reaction without the formation of by-products, the chemical reaction being an addition reaction within the epoxy-amine composition itself.

The color stability of the new infusible films has been found to be exceptionally good, both at ordinary temperatures and at higher temperatures.

Many of the new epoxy-amine compositions and reaction products, particularly when converted into the infusible state, present a remarkable combination of desirable properties, including higher resistance to ultraviolet light (minimum ultraviolet absorption); extreme resistance to hydrolysis by water and alkali with very low water permeability or absorption; extreme toughness; speed of drying approaching lacquer or shellac; adhesion to metal, glass and siliceous surfaces; flexibility at sub-zero temperatures; high degree of mar resistance; resistance to chemicals; insolubility to solvents; non-yellowing; ability to stand temperatures up to 400° F. with little or no discoloration; wettability to most pigments; low viscosity at high solids content of solutions; and hardening of thick films through chemical addition reactions within the film itself so that paint and varnish coatings far beyond the usual thickness can be applied.

These remarkable properties and combinations of properties make the new compositions, and products made therefrom, valuable for many practical purposes. No other materials so far as I am aware possess so many of the features desired for protective coatings, molded objects, films, filaments, etc.

This application is a continuation-in-part of my prior applications Serial No. 626,449, filed November 2, 1945, now Patent No. 2,592,560, and Serial No. 617,177, filed September 18, 1945, now Patent No. 2,585,115.

I claim:

1. The method of making insoluble, infusible molded products which comprises admixing normally solid complex resinous epoxides and polyfunctional polyethylene polyamines to form a molding mixture, the complex resinous epoxides being polymeric polyethers of dihydric phenols, said dihydric phenols being free from functional groups other than phenolic hydroxyl groups, said resinous epoxides resulting from the heating of the dihydric phenol with an excess of epichlorhydrin and of caustic alkali and having intermediate alcoholic hydroxyl-containing aliphatic groups and epoxide-containing terminal aliphatic groups, said resinous epoxides being free from functional groups other than alcoholic hydroxyl and epoxide groups, and the amount of polyfunctional polyamine being from about ¼ to about 1.7 of the amount equivalent to the resinous epoxide, considering one active hydrogen of the amine groups of the polyamine equivalent to one epoxide group of the complex epoxide, introducing a body of said mixture in the substantial absence of a solvent into a confining space, and heating said mixture in said confining space to form a insoluble, infusible product.

2. The process according to claim 1 in which the resinous epoxide is a polymeric polyether of dihydroxydiphenyldimethyl methane.

References Cited in the file of this patent

UNITED STATES PATENTS

| | | |
|---|---|---|
| 2,511,913 | Greenlee | June 20, 1950 |
| 2,592,560 | Greenlee | Apr. 15, 1952 |
| 2,786,794 | Gams et al. | Mar. 26, 1957 |

FOREIGN PATENTS

| | | |
|---|---|---|
| 251,647 | Switzerland | Sept. 1, 1948 |